United States Patent [19]

Wilhelm et al.

[11] Patent Number: 5,167,708
[45] Date of Patent: Dec. 1, 1992

[54] PROCESS FOR THE PREPARATION OF PIGMENTS CONTAINING $CR_2O_3$

[75] Inventors: Volker Wilhelm, Bergisch Gladbach; Dieter Messer, Odenthal, both of Fed. Rep. of Germany

[73] Assignee: Bayer Aktiengesellschaft, Leverkusen, Fed. Rep. of Germany

[21] Appl. No.: 856,351

[22] Filed: Mar. 23, 1992

[30] Foreign Application Priority Data

Apr. 4, 1991 [DE] Fed. Rep. of Germany ....... 4110880

[51] Int. Cl.$^5$ .............................................. C09C 1/34
[52] U.S. Cl. ..................................... 106/453; 106/441
[58] Field of Search ................................ 106/453, 441

[56] References Cited

U.S. PATENT DOCUMENTS 2,156,451  5/1939  Grasshoff et al. .................. 106/453
3,201,270  8/1965  Carpenter .

FOREIGN PATENT DOCUMENTS 1576015  7/1969  France .
51863    1/1942  Netherlands .

OTHER PUBLICATIONS

Chemical Abstracts, vol. 65, No. 5, 1965, Ohio.
World Patents Index, Derwent Publications, 79066018B, Week 36, & SU-A-635116.

*Primary Examiner*—Karl Group
*Assistant Examiner*—Chris Gallo
*Attorney, Agent, or Firm*—Connolly and Hutz

[57] ABSTRACT

A process for the preparation of chromate-free, $Cr_2O_3$-containing pigments having a spinel, haematite or corundum structure comprises blending pigment-forming raw materials corresponding to the $Cr_2O_3$-containing pigments with from 0.5 to 10% by weight of boric acid or phosphoric acid, calculated as $B_2O_3$ or $P_2O_5$, respectively, and then annealing the blend whereby the chromate-free, $Cr_2O_3$-containing pigment is obtained.

4 Claims, No Drawings

PROCESS FOR THE PREPARATION OF PIGMENTS CONTAINING $CR_2O_3$

The present invention relates to a process for the preparation of pigments having a spinel, hematite or corundum structure which are free from chromate and contain $Cr_2O_3$.

BACKGROUND OF THE INVENTION $Cr_2O_3$ is a component of a large number of pigments of various crystal structures. The colors of these pigments extend over a wide range of visible light. Color shades from ochre to dark brown are obtained in the spinel system (ZnMg) (Fe, $Cr)_2O_4$ by varying the cations. Color shades from light green to dark blue may be obtained in the system (ZnCo) (Cr, $Al)_2O_4$. Black pigments are also obtained in the spinel system. The color is produced by varying compositions of the oxides of Cu, Cr, Fe, Mn, Co and Ni. The hematite system (Fe, $Cr)_2O_3$ gives rise to various black-brown pigments, depending on the composition.

These pigments are technically important for use in lacquers, plastics, enamels and ceramics.

The afterannealing of pure $Cr_2O_3$ or mixtures of $Cr_2O_3$ and from 0.1 to 5% of $TiO_2$ gives rise to green pigments crystallizing in the corundum lattice which are used for special purposes, e.g. in the field of plastics, lacquers and refractory materials, in which primary particles of increased size are required.

All these $Cr_2O_3$-containing pigments are produced by wet or dry mixing the corresponding starting oxides, hydroxides or compounds which give rise to oxides under the reaction conditions, annealing the mixtures in the oven and then grinding them down to the required particle size (DE-C 2 338 012 and DE-C 2 320 806).

These methods, however, have the disadvantage that annealing produces furnace clinker containing substantial quantities of Cr(VI). Grinding these pigments must therefore be followed by washing and the wash water, which contains Cr(VI), must be subjected to an expensive reductive after-treatment wherein the $Cr^{3+}$ must be precipitated as $Cr(OH)_3$ and removed.

In addition, subsequent drying of the washed pigments or coloring substances is likely to be accompanied by partial back formation of chromate.

Coloring substances free from chromium(VI) and containing $Cr_2O_3$ may be obtained according to DE-A 3 118 966 by the addition of antimony(III) oxide during annealing. Antimony(III) oxide is, however, a physiologically potentially harmful material.

It is therefore an object of the present invention to provide a process which is free from the disadvantages described above.

BRIEF DESCRIPTION OF THE INVENTION

The prior art disadvantages discussed above are avoided in the preparation of chromate-free, $Cr_2O_3$-containing pigments having a spinel, hematite or corundum structure by following the process steps which comprise blending pigment-forming raw materials corresponding to the $Cr_2O_3$-containing pigments with from 0.5 to 10% by weight of boric acid or phosphoric acid, calculated as $B_2O_3$ or $P_2O_5$, respectively, and then annealing the blend whereby the chromate-free, $Cr_2O_3$-containing pigment is obtained.

DETAILED DESCRIPTION

It has now surprisingly been found that the formation of chromate is prevented by the addition of boric and/or phosphoric acid to the mixture of raw materials before annealing. The pigments need no longer be washed and may therefore be subjected to a simple process of dry grinding.

The present invention thus relates to a process for the preparation of chromate-free, $Cr_2O_3$-containing pigments having a spinel, hematite or corundum structure, characterised in that from 0.5 to 10% by weight of boric acid and/or phosphoric acid or their anhydrides (calculated as $B_2O_3$ or $P_2O_5$), based on the raw materials calculated as oxides, are added before annealing to the mixture of raw materials corresponding to the composition of the $Cr_2O_3$-containing pigments. This mixture of raw materials is then further processed by the usual methods. The addition of boric acid and phosphoric acid in quantities larger than the given range is also effective but not purposeful.

The addition of boric acid mineralizer in the preparation of spinel pigments is already known from Ullmann's Encyclopedia of Industrial Chemistry, Volume A5, 1986, page 554, but the quantities of boric acid used as mineralizer are normally less than those claimed here. When such small quantities of boric acid are used, no products free from chromium(VI) are obtained in the case of chromium-containing spinels.

The invention is illustrated below by means of Examples which, however, are not to be regarded as limiting.

EXAMPLES

Example 1

1150 kg of $Cr_2O_3$, 283 kg of $Fe_2O_3$ and 600 kg of CuO are suspended in 1400 liters of water and thoroughly mixed together. 30 kg of $H_3BO_3$ are then added to the resulting mixture. This mixture of raw materials is annealed at 1000° C. in a directly heated rotary tubular kiln. After annealing, the furnace clinker is ground wet. The clinker is free from Cr(VI) so that the suspension of ground material may be directly dried on a drier. A black pigment free from Cr(VI) is obtained after drying.

Example 2 (Comparison Example)

The procedure is the same as in Example 1 but without the addition of boric acid. A furnace clinker containing about 200 ppm of Cr(VI) is obtained. The wet-ground pigment suspension is washed free from Cr(VI) in a filter press. The wash water is collected separately and reduced to $Cr^{3+}$ with $FeSO_4$. The $Cr^{3+}$ is precipitated from this solution as $Cr(OH)_3$ by means of NaOH and separated off. Only then may the wash water be discharged as effluent.

Example 3

The procedure is the same as in Example 1 except that boric acid is replaced by an equal quantity of phosphoric acid. A furnace clinker free from Cr(VI) is obtained. This clinker is ground wet and dried on a belt conveyor drier without being washed. The pigment obtained as end product is free from Cr(VI).

Example 4

300 kg of CoO, 640 kg of $Al(OH)_3$ and 300 kg of $Cr_2O_3$ are mixed dry in a ploughshare mixer. A solution of 100 liters of 85% phosphoric acid in 100 liters of water is added to this pulverulent mixture and the mixture is again homogenised. The moist mixture is then annealed at 1200° C. The blue furnace clinker is free from Cr(VI) and may be ground wet or dry.

Example 5

The procedure is the same as in Example 4 except that 30 kg of boric acid are added to the mixture of raw materials instead of phosphoric acid. A chromate-free furnace clinker which may be ground wet or dry is obtained after annealing.

Example 6 (Comparison Example)

The procedure is the same as in Example 4 but without the addition of phosphoric acid. The furnace clinker obtained has a high chromate content which must therefore be reduced and precipitated as $Cr(OH)_3$ as described in Example 2.

Example 7

350 kg of zinc oxide, 350 kg of iron oxide yellow and 350 kg of $Cr_2O_3$ are thoroughly mixed with 1200 liters of water and 40 kg of boric acid in a ball mill. The resulting suspension is introduced into a rotary drum furnace, dried at 300° C. and then annealed at 1200° C. The reddish brown furnace clinker is free from chromate. It may be worked up into a pigment wet or dry and no re-oxidation to chromate occurs.

Example 8 (Comparison Example)

The procedure is the same as in Example 7 but without the addition of boric acid. A furnace clinker having a high chromate content is obtained. The chromate-containing wash waters obtained must be subjected to an expensive after-treatment of reduction and precipitation as described in Example 2.

Example 9

650 kg of FeO(OH), 350 kg of $Cr_2O_3$ and 40 kg of boric acid are mixed dry and the mixture obtained is annealed at 1200° C. A chromate-free black-brown coloring substance is obtained.

This may be ground wet or dry to form the pigment. If wet grinding is employed, the expensive aftertreatment of reductive precipitation may be omitted. No chromate is formed when the wet ground coloring substance is dried.

Example 10 (Comparison Example)

The procedure is the same as in Example 9 but without the use of boric acid. A furnace clinker containing about 300 ppm of chromate is obtained. Working up this clinker must again include the aftertreatment of the wash water already described.

Example 11

650 kg of α-FeO(OH) and 250 kg of $Cr_2O_3$ are mixed with 1000 liters of water and 20 liters of 85% phosphoric acid.

The suspension is introduced into a rotary drum furnace, dried at 150° C. and then annealed at 1150° C. A blackish brown furnace clinker free from chromate is obtained; this is then worked up as in Example 9.

Example 12 (Comparison Example)

The procedure is the same as in Example 11 but without the addition of phosphoric acid. A furnace clinker having a high chromate content is obtained. The wash water obtained after the coloring substance has been ground must again be subjected to the expensive after-treatment described above.

Example 13

1000 kg of $Cr_2O_3$ and 40 kg of boric acid are mixed dry in a ploughshare mixer and the mixture obtained is annealed at 1200° C. in a directly heated drum furnace. The dark green oven clinker obtained is free from chromate. It may be ground wet or dry. If wet ground, it requires no after-treatment by reduction and precipitation.

Example 14 (Comparison Example)

When the procedure described in Example 13 is adopted but without the addition of boric acid, a chromate-containing furnace clinker is obtained. The wash water obtained after wet grinding must be subjected to the after-treatment described above.

Example 15

1500 kg of $Cr_2O_3$ and 20 kg of $TiO_2$ are intensively mixed with 1500 l of water and 50 kg of boric acid in a ball mill. The mixture is introduced into a rotary drum furnace, dried at 300° C. and then annealed at 1150° C. The dark green furnace clinker is free from chromate and may be worked up wet or dry as already described.

Example 16 (Comparison Example)

If the procedure described in Example 15 is employed but without the addition of boric acid, products having a high chromate content are obtained. The wash water obtained from working up these products must be reductively after-treated before it may be discharged as effluent.

What is claimed is:

1. A process for the preparation of chromate-free, $Cr_2O_3$-containing pigments having a spinel, hematite or corundum structure which comprises blending chromium containing raw materials with from 0.5 to 10% by weight of boric acid or phosphoric acid, calculated as $B_2O_3$ or $P_2O_5$, respectively, and then annealing the blend whereby the chromate-free, $Cr_2O_3$-containing pigment is obtained.

2. A process according to claim 1 wherein the pigments are mixed phase pigments.

3. A process according to claim 1 wherein the $Cr_2O_3$ pigments have a corundum structure.

4. A process according to claim 1 wherein the $Cr_2O_3$ pigments have a $TiO_2$ content of from 0.1 to 5% by weight, based on the pigment.

* * * * *